US012518623B2

(12) United States Patent
Lauzière et al.

(10) Patent No.: US 12,518,623 B2
(45) Date of Patent: Jan. 6, 2026

(54) DATA-AUGMENTED VEHICLE STOP AVOIDANCE SYSTEM AND METHOD

(71) Applicant: Niosense Inc., Repentigny (CA)

(72) Inventors: Patrick Lauzière, Laval (CA); David Préville, Repentigny (CA); Derreck Bélair, Saint-Jérome (CA)

(73) Assignee: Niosense Inc., Repentigny (CA)

( * ) Notice: Subject to any disclaimer, the term of this patent is extended or adjusted under 35 U.S.C. 154(b) by 268 days.

(21) Appl. No.: 18/305,583

(22) Filed: Apr. 24, 2023

(65) Prior Publication Data

US 2023/0343213 A1 Oct. 26, 2023

Related U.S. Application Data

(60) Provisional application No. 63/334,761, filed on Apr. 26, 2022.

(51) Int. Cl.
*G08G 1/095* (2006.01)
*G08G 1/01* (2006.01)

(52) U.S. Cl.
CPC .......... *G08G 1/095* (2013.01); *G08G 1/0116* (2013.01); *G08G 1/0133* (2013.01)

(58) Field of Classification Search
CPC .... G08G 1/095; G08G 1/0116; G08G 1/0133; G08G 1/0112
See application file for complete search history.

(56) References Cited

U.S. PATENT DOCUMENTS

| | | |
|---|---|---|
| 7,098,806 B2 | 8/2006 | Bachelder |
| 7,432,826 B2 | 10/2008 | Schwartz |
| 7,515,064 B2 | 4/2009 | Schwartz |
| 8,878,695 B2 | 11/2014 | Cross |
| 8,884,783 B2 | 11/2014 | Roberts et al. |
| 8,922,392 B1 | 12/2014 | Chandra et al. |
| 9,704,394 B2 | 7/2017 | Taylor |
| 9,953,522 B2 | 4/2018 | Cross et al. |
| 10,217,356 B2 | 2/2019 | Baller |
| 10,692,367 B2 | 6/2020 | Nguyen |

(Continued)

FOREIGN PATENT DOCUMENTS

| | | |
|---|---|---|
| CN | 102097005 | 6/2011 |
| CN | 105206070 | 12/2015 |

(Continued)

*Primary Examiner* — Madison R. Inserra
(74) *Attorney, Agent, or Firm* — Stratford Group Ltd.

(57) ABSTRACT

Described are various embodiments of a system and method for minimizing a number of stops made by a target vehicle travelling along a path, the path comprising a plurality of actionable subsystems. In one embodiment, the method comprises receiving, at a server from one or more geolocation reporting devices via a network, geolocation data of the vehicle, estimating, by the server, using said geolocation data, a likelihood that an upcoming subsystem of the plurality of actionable subsystems is an avoidable stop for the vehicle; and upon the upcoming subsystem being an avoidable stop, requesting by the server an action request to the upcoming subsystem via the network. In some embodiments, the method uses a kinematic model or a probabilistic model to compute an estimated arrival time (ETA) of said vehicle to a target location of an upcoming subsystem of said plurality of actionable subsystems.

20 Claims, 10 Drawing Sheets

(56) References Cited

U.S. PATENT DOCUMENTS

| | | | |
|---|---|---|---|
| 10,991,243 B2 | 4/2021 | Raamot | |
| 12,055,942 B1 * | 8/2024 | Gogna | G05D 1/628 |
| 2009/0051568 A1 * | 2/2009 | Corry | G08G 1/081 |
| | | | 340/936 |
| 2012/0016576 A1 * | 1/2012 | Huang | G01C 21/3469 |
| | | | 701/423 |
| 2017/0074964 A1 * | 3/2017 | Xu | G01S 13/74 |
| 2020/0041995 A1 * | 2/2020 | Quillin | G05D 1/0088 |
| 2020/0193818 A1 | 6/2020 | Cross | |
| 2020/0355508 A1 | 11/2020 | Bruns et al. | |
| 2020/0388151 A1 | 12/2020 | Bhavnani et al. | |
| 2021/0171040 A1 * | 6/2021 | Grubwinkler | B60W 30/18018 |
| 2023/0075840 A1 * | 3/2023 | Chenchu | G01C 5/00 |
| 2024/0208501 A1 * | 6/2024 | Kitahara | G08G 1/09 |

FOREIGN PATENT DOCUMENTS

| | | | |
|---|---|---|---|
| CN | 109544929 | 3/2019 | |
| CN | 110070222 | 7/2019 | |
| CN | 111091312 | 5/2020 | |
| DE | 102016219960 | 4/2018 | |
| IN | 2015MU02121 | 12/2015 | |
| JP | 2007066183 | 3/2007 | |
| JP | 2009116692 | 5/2009 | |
| KR | 20120029772 | 3/2012 | |
| KR | 102256644 | 5/2021 | |
| WO | WO-2015068034 A1 * | 5/2015 | G08G 1/081 |
| WO | 2016204599 | 12/2016 | |
| WO | 2020257926 A1 | 12/2020 | |
| WO | WO-2021073716 A1 * | 4/2021 | G08G 1/0133 |

\* cited by examiner

DATA-AUGMENTED VEHICLE STOP AVOIDANCE SYSTEM AND METHOD

CROSS-REFERENCE TO RELATED APPLICATIONS

This application claims the benefit of U.S. Provisional Patent Application 63/334,761, which was filed on Apr. 26, 2022, which is incorporated herein by reference in its entirety.

FIELD OF INVENTION

The present invention relates to traffic management, and more particularly to a data-augmented vehicle stop avoidance system and method.

BACKGROUND

Each stop made by a vehicle has significant implications, including time delays or energy use. For example, radio-frequency tags and readers are often used to track containers and cargo being moved from one location to another. For example, such tags are often attached to containers transported by ships and these are loaded into trucks to be moved to a plurality of locations to be unloaded. Tags can also be used to track vehicles in closed environments such as various facilities and ports. In some instances, these tags may also be used to trigger barriers or the like. However, this functionality is typically limited and only used to trigger gates or the like on port grounds. Generally, these systems are not configured to be interfaceable or usable to trigger traffic signals on public roads or the like. In addition, these usually provide low quality positional data and are thus difficult to use to accurately geolocate the vehicle. Precise geolocation is required to efficiently trigger traffic signals and/or lights or the like so as to avoid stops, which these tags alone cannot provide.

In addition, there may be devices that use real-time GPS self-reporting data for avoiding stops, however these devices are generally capable only of using real-time GPS self-reporting data which is low latency/high resolution—e.g., wherein GPS positions are transmitted approximately every 1-5 seconds. However, with higher latency/lower resolution (e.g., GPS positions are transmitted less frequently than every 5 seconds), it generally becomes difficult to develop methods to estimate whether an upcoming stop is avoidable, and, similarly, with such data, it becomes difficult to trigger traffic infrastructure to enable a vehicle to avoid stopping.

Therefore, there is a need for a system and method that uses and augments positional information provided by such tags and readers so as to trigger a plurality of actionable subsystems, such as traffic lights or the like, so as to minimize the number of avoidable stops made by the vehicle along its route.

BRIEF SUMMARY

The following presents a simplified summary of the general inventive concept(s) described herein to provide a basic understanding of some aspects of the disclosure. This summary is not an extensive overview of the disclosure. It is not intended to restrict key or critical elements of the embodiments of the disclosure or to delineate their scope beyond that which is explicitly or implicitly described by the following description and claims.

A need exists for a system and method that allows vehicles to minimize the number of avoidable stops encountered along a route. Some aspects of disclosure provide embodiments of such systems and methods.

In accordance with a first aspect, there is provided a computer-implemented method for minimizing a number of stops made by a vehicle traveling along a path, said path comprising a plurality of actionable subsystems, the method comprising the steps of: receiving, at a server from one or more geolocation reporting devices via a network, geolocation data of said vehicle; estimating, by the server, using said geolocation data, a likelihood that an upcoming subsystem of said plurality of actionable subsystems is an avoidable stop for said vehicle; and upon said upcoming subsystem being an avoidable stop, requesting by the server an action request to said upcoming subsystem via said network.

In one embodiment, one or more geolocation reporting devices are positionally coupled to said vehicle.

In one embodiment, the geolocation data includes GPS coordinates.

In one embodiment, the one or more geolocation reporting devices comprise one or more radio frequency (RF) readers located along said path, the one or more RF readers configured to receive one or more signals emitted by a RF tag emitter positionally coupled to said vehicle upon said tag emitter being in signal range of said one or more tag readers.

In one embodiment, the RF tag readers and RF tag emitters operate according to the Bluetooth® or Ultra-Wide Band standards.

In one embodiment, the estimating is done, at least in part, using a plurality of data sources comprising one or more of: statistical travel information generated using a plurality of previously recorded travel information of a corresponding plurality of previously monitored vehicles; real-time sensor information acquired by a plurality of sensors and related to said target vehicle and to a plurality of secondary target assets, said secondary target assets also moving along or across said path; real-time self-reported geolocation information received from a plurality of geolocation-capable devices; maps and routing information; and weather information.

In one embodiment, the geolocation is a low-resolution geo location.

In one embodiment, the method further comprises the step of, before said estimating, augmenting, using said machine-learning model, said low-resolution geolocation into a high-resolution geolocation.

In one embodiment, estimating comprises the steps of: calculating, using at least one of: a kinematic model or a probabilistic model, an estimated arrival time (ETA) of said vehicle to a target location of an upcoming subsystem of said plurality of actionable subsystems; and computing a first probability of said vehicle being forced to stop at said upcoming subsystem at said ETA; and upon said first probability being higher than a first threshold, computing a second probability of said stop being avoidable upon an action request being made to said upcoming subsystem.

In one embodiment, estimating comprises the steps of: calculating, using a difference between a first time that a first signal is received from said one or more geolocation reporting devices by the server, and a second time that a second signal is received, a latency value; determining, by the server, using at least in part the latency value, via said machine learning model, a latency threshold; upon said latency value being above said latency threshold not marking said upcoming subsystem as an avoidable stop.

In one embodiment, the method further comprises the step of, before said not marking, lowering said latency threshold based on, at least in part, said additional data.

In one embodiment, the method further comprises the steps of: verifying whether or not the avoidable stop was avoided; and upon said stop being avoided, recording the stop as an avoided stop along said path.

In one embodiment, the action request includes at least one of: a virtual advanced traffic detection request, a priority service request, or a preemption service request.

In one embodiment, the plurality of actionable subsystems comprises one or more of: traffic signals, barriers, or road-related infrastructure.

In accordance with another aspect, there is provided a system for minimizing a number of stops made by a target vehicle travelling along a path, said path comprising a plurality of actionable subsystems, the system comprising: one or more geolocation reporting devices; a server, the server comprising one or more processors and a memory, the one or more processors being communicatively coupled to said plurality of geolocation reporting devices via a network, and wherein said memory comprises instructions that, when executed by said one or more processors, configures the server to: receive, from one or more geolocation providing devices, geolocation data of said vehicle; estimate, using said geolocation data, a likelihood that an upcoming subsystem of said plurality of actionable subsystems is an avoidable stop for said vehicle; and upon said upcoming subsystem being an avoidable stop, request an action request to said upcoming subsystem via said network.

In one embodiment, the one or more geolocation reporting devices are positionally coupled to said vehicle.

In one embodiment, the geolocation data includes GPS coordinates.

In one embodiment, the one or more geolocation reporting devices comprise one or more radio-frequency (RF) readers located along said path, the one or more RF readers configured to receive one or more signals emitted by a RF tag emitter positionally coupled to said vehicle upon said tag emitter being in signal range of said one or more tag readers.

In one embodiment, the RF tag readers and RF tag emitters operate according to the Bluetooth® or Ultra-Wide Band standards.

In one embodiment, the estimating is done, at least in part, using a plurality of data sources comprising one or more of: statistical travel information generated using a plurality of previously recorded travel information of a corresponding plurality of previously monitored vehicles; real-time sensor information acquired by a plurality of sensors and related to said target vehicle and to a plurality of secondary target assets, said secondary target assets also moving along or across said path;

real-time self-reported geolocation information received from a plurality of geolocation-capable devices; maps and routing information; and weather information.

In one embodiment, the geolocation is a low-resolution geolocation.

In one embodiment, the server, upon receiving said low-resolution geolocation, augments, using said machine-learning model, said low-resolution geolocation into a high-resolution geolocation.

In one embodiment, the instructions further configure the server to: calculate, using at least one of: a kinematic model or a probabilistic model, an estimated arrival time (ETA) of said target vehicle to a target location of an upcoming subsystem of said plurality of actionable subsystems; and compute a first probability of said target vehicle will be forced to stop at said upcoming subsystem at said ETA; and upon said first probability being higher than a first threshold, compute a second probability of said stop being avoidable upon an action request being made to said upcoming subsystem.

In one embodiment, the instructions further configure the system to: calculate, using a difference between a first time that a first signal is received from said one or more geolocation reporting devices and a second time that a second signal is received, a latency value; determine, using at least in part the latency value, via said machine learning model, a latency threshold; and upon said latency value being above said latency threshold, not marking said upcoming subsystem as an avoidable stop.

In one embodiment, the instructions further configure the server to, before said not marking, lowering said latency threshold based on, at least in part, said additional data.

In one embodiment, the instructions further configure the server to: verify whether or not the avoidable stop was avoided; and upon said avoidable stop being avoided, record the avoidable stop as an avoided stop along said path.

In one embodiment, the action request includes at least one of: a virtual advanced traffic detection request, a priority service request, or a preemption service request.

In one embodiment, the plurality of actionable subsystems comprises one or more of: traffic signals, barriers, or road-related infrastructure.

In accordance with another aspect, there is provided a non-transitory computer-readable storage medium, the computer-readable storage medium including instructions that when executed by a processor, causes the processor to: receive, via a network, from one or more geolocation reporting devices, geolocation data of said vehicle; estimate, using said geolocation data, a likelihood that an upcoming subsystem of said plurality of actionable subsystems is an avoidable stop for said vehicle; and upon said upcoming subsystem being an avoidable stop, request an action request to said upcoming subsystem via said network.

In one embodiment, the instructions further cause the processor to: verify whether or not the avoidable stop was avoided; and upon said avoidable stop being avoided, record the avoidable stop as an avoided stop along said path.

Other aspects, features and/or advantages will become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein.

DETAILED DESCRIPTION

Figure 1:
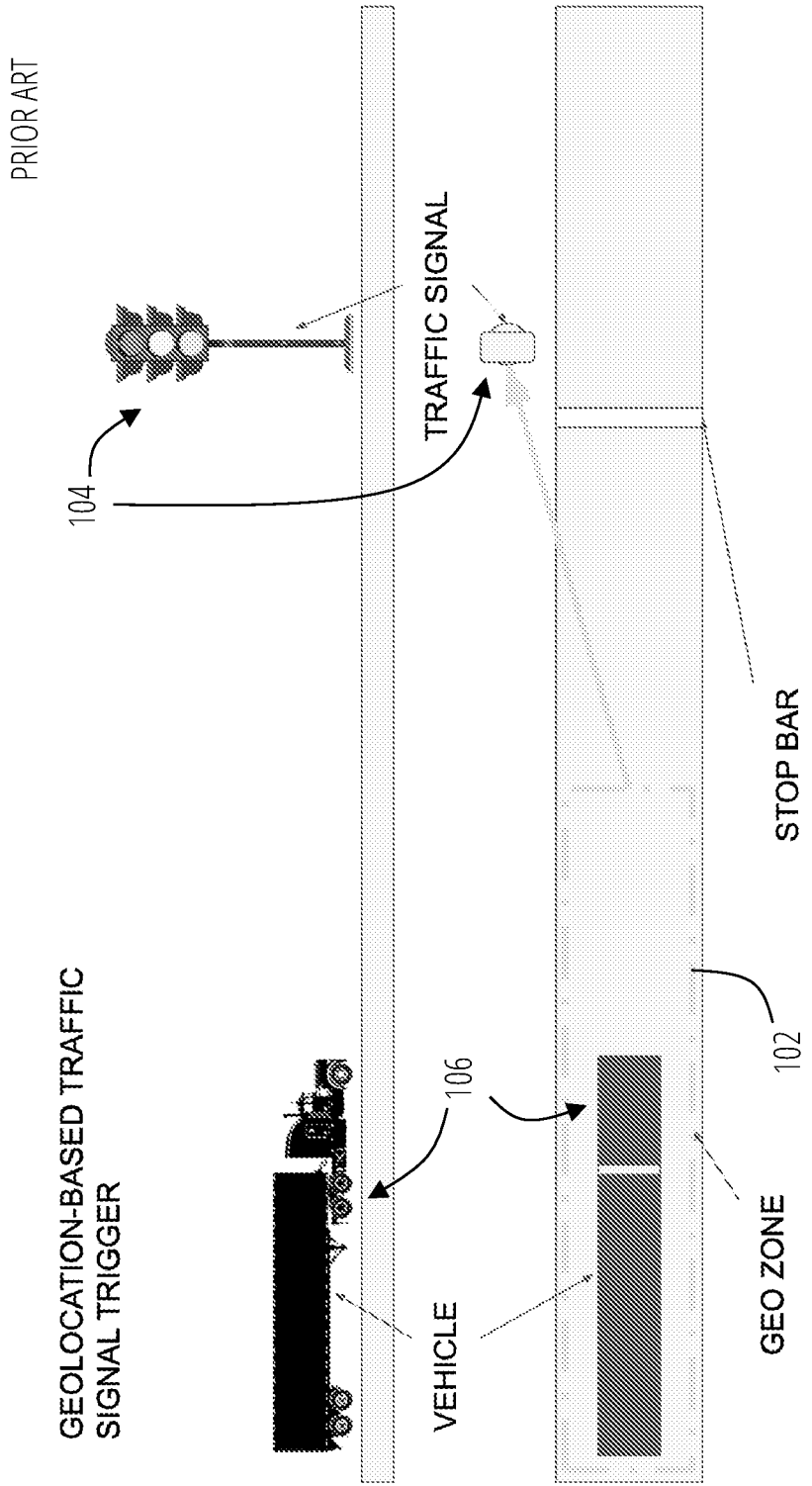
FIG. 1, FIG. 2 and FIG. 3 are schematic diagrams illustrating different aspects of the prior art, in accordance with one embodiment.

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all the features of any one apparatus or process described below or to features common to multiple or all the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Traffic signals, traffic lights, and the like, are sometimes able to receive external signals to modify their behavior so that vehicles may avoid stopping. There is a need for a system and method which minimizes the number of stops, and more specifically, the number of avoidable stops, made along a route by a vehicle, and thereby maximizes the number of avoided stops made along a route by a vehicle.

There is a need for a system and method that uses and augments positional information provided by geolocation signal emitters and readers, to trigger a plurality of actionable subsystems, such as traffic signals or the like, so as to facilitate interactions between vehicles and traffic signals, and minimize the number of stops made by a vehicle along its route.

The device and method described herein provide, in accordance with different embodiments, examples of a data-augmented tag-based vehicle stop avoidance system and method, for instance, a system and method for minimizing a number of avoidable stops made by a vehicle along a path or route, the path comprising a plurality of actionable subsystems thereon, for example traffic lights, barriers or the like that may force the vehicle to momentarily stop in proximity thereof. These actionable subsystems may be remotely triggered, activated, or deactivated or in other cases the operation thereof can be influenced or changed via a plurality of requests thereto, for example by having a traffic light change at a moment determined by said stop avoidance system and method, so as to avoid the vehicle stopping at the intersection.

In some embodiments, the system and method for minimizing a number of avoidable stops made by a vehicle along a path or route is augmented by data received from signals emitted from a variety of emitters attached to or located near the vehicle, the emitters including, but not limited to, tag emitters, cellular devices of a driver, GPS devices, and the like. Data emitted by the sources may comprise radio-frequency (RF) signals, which may provide low-resolution and/or noisy movement, kinematic, or positional information.

In accordance with an embodiment of the invention, there may be disclosed examples of a vehicle stop avoidance system and method, and more specifically, a data-augmented tag-based vehicle stop avoidance system and method, for minimizing a number of avoidable stops made by a vehicle along a path or route, the path comprising a plurality of actionable subsystems thereon, for example traffic lights, barriers or the like that may force the vehicle to momentarily stop in proximity thereof. These actionable subsystems may be remotely activated/deactivated or in other cases the operation thereof can be influenced or changed via a plurality of requests thereto, for example by having a traffic light change at the right moment to avoid the vehicle stopping at the intersection.

For example, and as will be detailed further below, some of the embodiments considered herein invoke a system in which low-resolution and noisy positional and kinematic information acquired via a short range radio frequency (RF) tag or device attached to or located in the vicinity of a moving target vehicle is augmented into high-resolution geolocation and kinematic data using a sensor information acquired by a plurality of sensors located along or near road-related infrastructure. In addition, the system further leverages a plurality of machine-learning methods and algorithms trained on previously acquired positional and kinematic information and assisted by a plurality of external data sources so as to provide outcome analytics, such as optimized decisions based on one or a combination of low resolution information and/or data.

In one non-limiting example, this augmented information may be used by the system to estimate or anticipate an estimated arrival time (ETA) of the target vehicle to a next or upcoming actionable subsystem. This may be done using either dynamics or kinematics-based models, or probabilistic models, or a combination of the two. In addition, in some embodiments, a determination can be made if the target vehicle will likely have to stop at that time, and whether it is possible to avoid the stop by sending a request to the subsystem before the target vehicle reaches it. If the system determines that this is indeed the case, then a request may be made to the actionable subsystem (e.g., traffic light) to avoid the stop. The system is further configured to verify if the stop was indeed avoided, thus counting the number of avoided stops along the path or route, which may be used, for example, to charge a user a fee per avoided stops. In contrast, some embodiments may avoid computing an ETA, and may use the multiple inputs to directly generate outputs to the actionable subsystems so that a desired outcome (e.g., reducing the number of stops) is achieved through computer-based optimizations only.

Other examples may not rely on computing an ETA, but instead use the plurality of low-resolution data, in combination with a plurality of data sources, to determine if and when the requests may be sent based on, for example, identified correlations or relationships in the data.

Advantageously, the system and method described below, in accordance with different embodiments, acts as an agnostic interface that allows data generated by different types of sources to be used. It relies on degraded, anonymized, combined, aggregated and or simplified flows of data relating to vehicles' locations and movements in order to achieve a similar outcome without requiring direct interoperability and compatibility between systems. Thus, the system and method can be configured to work with existing systems, for example RF systems used to track packages or containers, with no or minimal modifications. For example, these may be pre-installed hardware devices that may be provided by a range of different manufacturers and which each rely on different standards and/or protocols. The system and method, as will be further discussed below, is typically configured to collect and process together the data from these different data sources.

Figure 2:
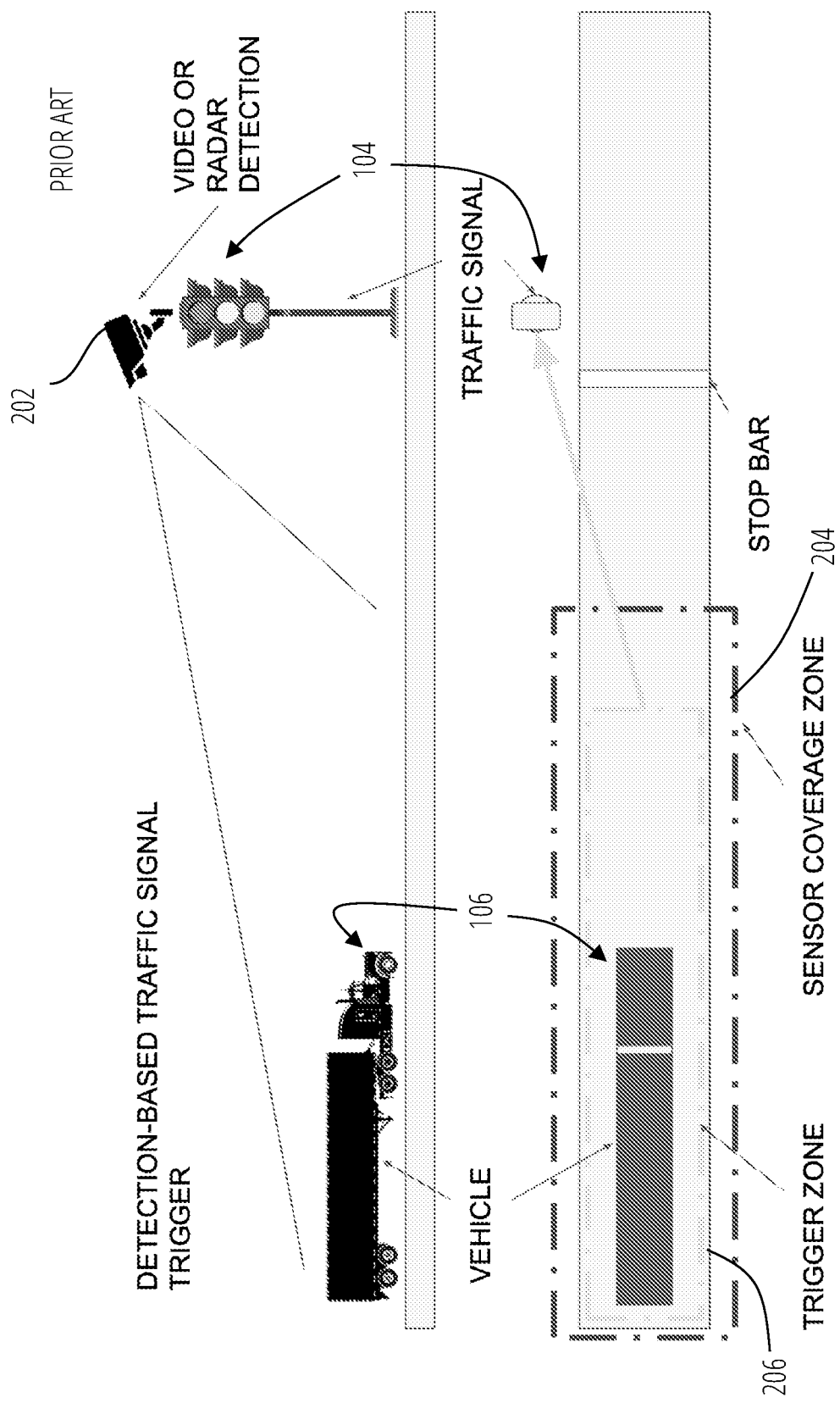
Figure 3:
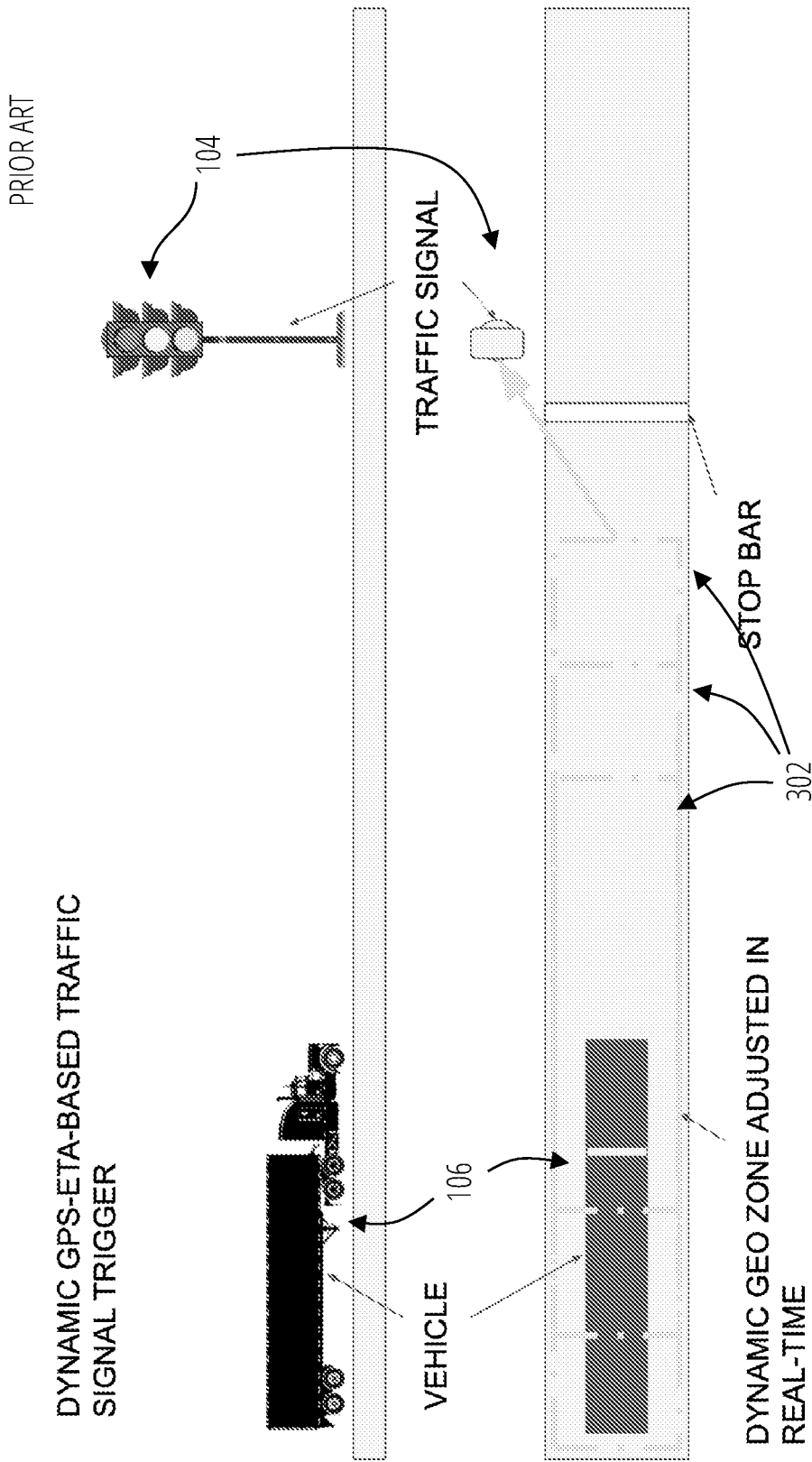

FIGS. 1 to 3 illustrate schematically some methods and systems currently known in the art. FIG. 1 shows a system using a typical geolocation-based traffic signal trigger system. Geolocation is any method that allows someone to determine with a known accuracy where an object, user, or vehicle is located. There are many ways to achieve this, including GPS self-reporting of location. In the example of FIG. 1, a fixed geo zone 102 is pre-defined on an area of the road at a given distance from a traffic signal 104. Typically, the operations of traffic signals at an intersection are controlled by a traffic controller. A typical intersection is usually installed with one traffic cabinet and multiple traffic signal heads, each head usually controlling one 'phase' or one way of arriving at the intersection.

A typical North-American intersection has four approaches into the intersection, each served by one or many sets of lights (red-yellow-green), although many other arrangements exist. Inside the traffic control cabinet usually one can find a computer, control unit, or some form of local sequence management, which we call the traffic controller. In some parts of the world, this controller is driven and programmed in generic control languages, in others, there are standards and business rules that force the user to program the sequence using predetermined functions or timing constraints such as clearance for the timing of a yellow light, all-red for safety when there are phase transitions, and so on. Traffic controllers can be autonomous or connected to a form of central system, but generally for valid reason they have some form of local operation that can be maintained regardless of connectivity status with the network.

Going back to the example of FIG. 1, when a vehicle 106 being self-geolocated to be within the geo zone 102, this automatically triggers the system to send a request to the traffic controller of the traffic signal 104 so that the vehicle 106 will not be forced to stop when it reaches it. Different methods of communication with the network-connected traffic controllers are known in art. For example, these may include:

Direct communication: requires modern (less than 10 years old at the time of this writing) traffic controllers where communication with the controller is done using published protocols and standards such as National Transportation Communications for Intelligent Transportation System Protocol (NTCIP);

Central system: requires that the city has put in place a central system. In some instances, a published application programming interfaces (APIs) and protocols may be used to place requests to the central system, enabling the city to perform central management of requests; and Edge: An edge computing system, for example a proprietary or third-party system such as provided by a cellular carrier or cloud provider may be used to connect to the traffic controller directly and perform local computing of inputs as well as insert additional data in the flow to allow the controller to process it seamlessly.

Different techniques are known in the art that can be used to trigger a traffic signal so as to avoid a vehicle stopping at that location. These may include, for example and without limitation: virtual advanced traffic detection requests, requesting priority service or requesting preemption server.

FIG. 2 illustrates another example of a prior art system, a detection-based traffic signal trigger system. In this example, a plurality of sensors, for example a video or radar detection device 202, are installed near the intersection so as to provide a wide sensor coverage area 204. This type of system automatically triggers a request to the traffic signal 104 upon the vehicle 106 entering a trigger zone 206 within this sensor coverage area 204. In order to feed the controller inputs, many types of sensors have been developed over time. The following is a non-exhaustive list of currently used sensor types:

Loops: one of the simplest but most intrusive ways of detecting vehicles, loops have been around for over 50 years. They are typically made using conduits with wiring buried under the surface of the road and they detect variations in the magnetic field generated by the presence of metal on the road (usually a vehicle). Loops are known to cause issues because they are hard to fix when they break, and they cannot be moved when the road is reconfigured or when they have not been placed in the optimal position. While a loop is cheap, its installation is very expensive and its coverage is very limited, since each loop can only detect metal above it. So, in order to manage multiple vehicle types, speeds, distances, loops are generally too expensive. One loop also generates only one binary output per loop, so due to controller input limitation, usually one cannot install more than 16 or 32 loops on an intersection. Loops cost around $500 each but can cost over $1500 each to install. Loop control hardware is also required in the traffic control cabinet.

Pucks: pucks are essentially wireless loops. While they do not require digging conduits, they generally have similar limitations in area coverage. Pucks are also limited to around 7 years of operation due to the limitations of their battery size. Pucks are generally less than $1000 each, but, like loops, there are generally many required to cover larger areas and each system requires a transponder to connect them to a traffic controller.

Radars: radars are small boxes that can be mounted above the road to scan an area for presence of objects that reflect radio waves at high frequencies. They typically cover 150 feet for high resolution (high resolution radars have a resolution of 2 ft) and 400 to 800 feet for models specifically designed for long range detection, albeit with less resolution and accuracy. Radars are non-intrusive methods of detection, meaning that they are installed above the road. Typically, a radar is installed 15' to 50' above ground. Radars can have multiple detection zones, and work very well in all weather due to radar waves that are almost not affected by rain, snow, light, or any other element. Radar also has the advantage of providing accurate ranging, allowing the radar system to determine exactly the distance at which an object is located. One drawback is they cannot distinguish between the objects that are being detected: a motorcycle provides the same output as a bus. Sometimes they also have a hard time detecting smaller objects such as bicycles. They cannot reliably detect pedestrians. Some recent radar developments indicate, however, that radar resolution with new frequency bands can be more accurate. Radars are relatively expensive at $25k-$50k of equipment per intersection (depending on range and coverage required, and not including installation charges).

Video: video detection has made a lot of progress recently. With deep learning and AI growth, video detection has greatly improved. One advantage of video detection is that it is extremely cost effective while also being non-intrusive. A typical ruggedized camera can cost (retail) less than $2000, and some manufacturers offer systems that use a fisheye (wide-angle) lens that allows them to use a single camera for a complete intersection, versus the traditional video detection arrangement of one camera per approach. Video detection sometimes has difficulties in determining the distance at which objects are, relying on simplifications such as headlight spacing or pixel positioning to estimate the distance. Video has also traditionally been affected largely by weather conditions, although recent advances have reduced those drawbacks significantly. The low cost of sensors, coupled with continuous improvements of algorithms have made video detection a great candidate for new business models like subscriptions. The drawback of new video systems is that they generally require expensive hardware at the intersection to run the AI, resulting in higher initial costs. A traditional video detection system costs around $12k for the equipment+installation on a 4-approach intersection. A new AI-based system costs around $20k of equipment per intersection and usually, there will be some form of recurring fee for connectivity to some central system.

Lidars: Lidars (light detection and ranging) have recently appeared as detection sensors. With the advent of autonomous vehicles, lidars have become more affordable and reliable for detecting traffic in all weather conditions. While radars use radio waves to detect and determine the distance of objects, lidars use light waves to do the same. While light can be affected by weather and interfering light objects (such as tree leaves), lidar has the advantage of being able to very accurately range objects and detect all types of traffic, including bicycles and pedestrians, reliably. Lidars are particularly suitable where there is a dense environment with multiple interactions and complex arrangements of objects, moving or not. The resolution of lidar has many advantages over radar, and its ranging capabilities make it better than video. Lidars are relatively expensive, costing around $30k for the equipment of a typical intersection which uses one lidar.

Virtual detectors: with the advent of mobile devices and connectivity, a new category of sensors has emerged. Because mobile devices can determine their own position, they can share it with central systems and, if the intersection has network coverage, they can be used as a source of detection. For now, virtual detection is used mainly in high latency operations such as bus detection for priority requests, fire trucks detection for preemption, etc. Since not every vehicle, pedestrian or bike is equipped with a location sharing mobile device, and since each user shall have the freedom to share a position or not based on his or her own preference, virtual detection is destined to be used to complement other methods of detection, not to replace them.

Connected vehicles: V2X or Vehicle to Everything can also be used to share locations between vehicles, infrastructures, and central systems for the purpose of interacting. V2X-based systems typically use some form of geolocated coordinates system and trajectory information to accurately determine if a collision will occur, if a vehicle will be stopped, or if an action needs to be taken.

Sensor fusion: combining multiple sensors has recently been established as a way to complete the information received from various sources, generating new data and enabling to use the best of each sensor technology. While, in some situations, this may not be ideal and may lead to reliability issues, data conflicts or bad outcomes, namely for self-driving decision making, there are situations where sensor fusion can allow for a more complete and seamless coverage of an area, enabling new ways of interfacing the outside world to traffic controllers.

FIG. 3 illustrates a third example of a prior art system based on dynamic GPS-based ETA traffic signal triggers. In this example, the geo zone 302 is dynamically adjusted in real-time around the vehicle's position, and an estimated time of arrival (ETA) is calculated based on the location the dynamic geo zone 302.

The prior art examples given above all have the deficiencies that these systems mentioned above cannot interoperate with tag-based tracking systems, such as systems using radio frequency tags and readers used to track containers or the like. Thus, a vehicle operator already using the tag-based system would have to use additional systems and methods, from other providers and at additional expense, so as to be able to minimize the number of stops made by his or her vehicle while transporting such containers on public roads or the like.

Figure 4:
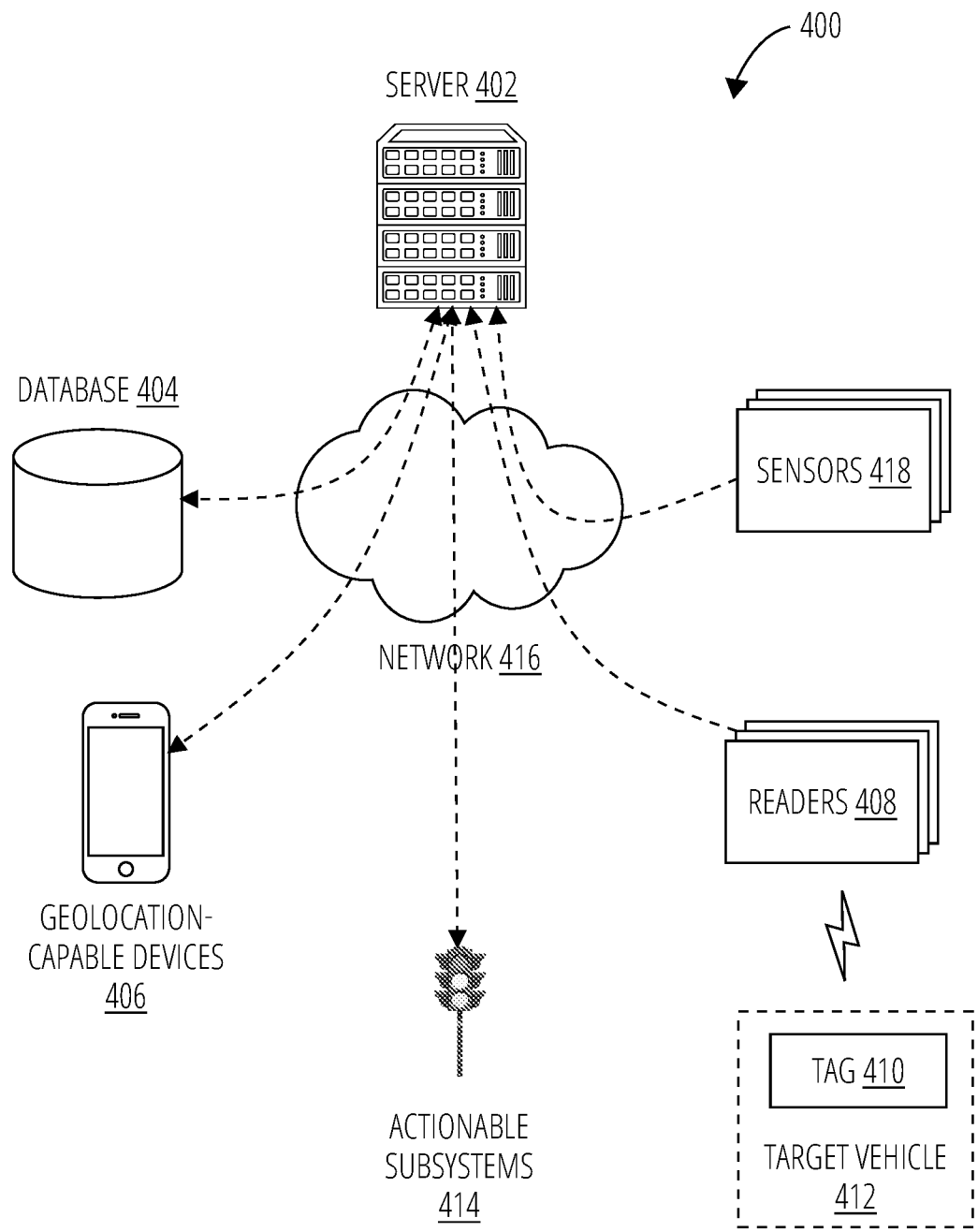
FIG. 4 is a schematic diagram illustrating a data-augmented tag-based vehicle stop avoidance system and method, in accordance with one embodiment.

With reference to FIG. 4, and in accordance with different exemplary embodiments, a data-augmented tag-based vehicle stop avoidance system, generally referred to using the numeral 400, will now be described. In some embodiments, system 400 comprises at least one server 402 communicatively coupled, via a network, to a database 404, and one or more one or more geolocation-capable or geolocation reporting devices 406, a plurality of readers and/or receivers 408, for receiving or reading signals, one or more tags emitters 410, for sending or emitting signals, that are positionally associated with a vehicle, including a moving target vehicle 412 (e.g., typically on a container being transported by the target vehicle, or located on-board the target vehicle itself), and a plurality of actionable subsystems 414 that are located along a path or route of said moving target vehicle 412. Each of the readers 408 are configured to detect and receive one or more signals, including wireless signals, emitted by the tag emitters 410 upon said tag emitters 410 being in signal range of the reader.

In some embodiments, the tags emitters 410 and the readers 408 may be radio frequency (RF) tags and readers, for emitting and reading radio frequency signals.

In such embodiments, system 400 comprises at least one server 402 communicatively coupled, via a network, to a database 404, one or more geolocation-capable devices 406, a plurality of radio frequency (RF) readers and/or receivers 408, one or more RF tags emitters 410 that are positionally associated with a vehicle, for example a moving target vehicle 412 (e.g., typically on a container being transported by the target vehicle, or located on-board the target vehicle itself), and a plurality of actionable subsystems 414 that are located along a path or route of said moving target vehicle 412. Each of the RF readers 408 are configured to detect and receive a wireless signal emitted by the RF tag emitters 410 upon said tag emitters 410 being in signal range of the reader.

The server 402 typically comprises a networking module (not shown) and is configured to receive and send signals, information, and/or data via a network 416. In some embodiments, the network 416 may comprise a plurality of interconnected networks, and may use any known wired or wireless communication method or process, alone or in combination. The network 416 may be used to receive signals, information and/or or data, for example from the readers 408, sensors 418, geolocation-capable devices 406 or database 404, or actionable subsystems 414. It can also be used to send data or requests, for example requests to the actionable subsystems 414. Non-limiting examples of networks include landlines, RF networks, or network IP connections, either direct connections or through a VPN.

In some embodiments, the actionable subsystems 414 may comprise traffic signals or the like but also any network-connected and/or network-connectable device that may force the target vehicle 412 to stop, such as barriers or the like. In some embodiments, these may include moving or mobile actionable subsystems. These may include, for example, mobile construction barriers, signals, or even vehicles.

In some embodiments, the tags emitters 410 and readers/receivers 408 may be based on the Bluetooth® (such as Bluetooth Low Energy or BLE) or the Ultra-Wide Band (UWB) standards or the like. The skilled person in the art will appreciate that any short-range RF tracking technology may be equally used as well (e.g., RFID tags and readers, or the like), without departing from the scope of the present disclosure. In some embodiments, this may include ranges of the order of 100 m or less, although the system 400 may be configured to work with devices having a larger signal range or even with multiple RF devices having a plurality of different ranges. In some embodiments, the range may change depending on the arrangement of the radio receivers, emitters or antennas. In some embodiments, the server 402 may be configured to receive information from different types of RF tags and readers based on different technologies and/or standards and/or from different manufacturers simultaneously.

In some embodiments, the tags emitters 410 and readers 408 may be part of an already-existing 3rd-party RF-based system and not part of system 400, but in communication with system 400.

In one non-binding example, a Port Authority may have its own systems in place to track containers being loaded to or unloaded from ships. These systems are already programed or configured to receive RF-based triggers based on the presence of tags within the range of a reader. In some embodiments, the system 400 is configured so that the information provided by these systems will first be used by the Port Authority, and then shared or communicated, at least in part or in some form, with system 400. Thus, in some embodiments, 3rd-party systems may be relied on for tracking the vehicles using the tags emitters 410 and readers 408 and only the raw or processed data received from those 3rd-party systems may be used to generate triggers.

The real-time sensor information may comprise, in some embodiments, sensor data acquired by a plurality of sensors. These sensors can include any known type of sensor in the art. Non-limiting examples include lidars, cameras, radars, loops and pucks. The sensor information may include information (e.g., position, size, velocity, etc.) about the target vehicle acquired by the sensors, but also information about secondary targets that are distinct from the target vehicle but the presence of which may affect the travel time of the target vehicle. Non-limiting examples of secondary targets include pedestrians, buses, bikes, other vehicles, or the like. Sensor information may be transmitted or communicated to the system 400 via either RF transmission or cellular transmission, although other types of wired or wireless communication technology may be used as well. Once received by the system 400, the real-time sensor information may itself also be correlated, augmented, and used in optimization algorithms to generate triggers.

In some embodiments, the tag emitters 410 and readers 408 may be geolocation-capable devices 406, for sending emitting and receiving GPS signals.

In some embodiments, the emitters 410 and readers 408 may comprise a plurality of different capabilities, for example emitting and receiving different signals, including, but not limited to, GPS and radio frequency signals.

In some embodiments, one kind of signal may prove to be sufficient for providing an estimate of whether or not a stop may be avoided by a vehicle traveling along a path.

Alternatively, one kind signal may not be sufficient for providing an estimate of whether or not a stop may be avoided—for example, the emitters may be emitting signals at a frequency too low to result in an accurate estimation. In such an example, it may be preferable to use a plurality of signal types in order to enhance any signals received by the reader and thus augment data used in optimization algorithms and/or trigger generation. Additionally, or alternatively, it may be preferable to use external information to augment data used in optimization algorithms and/or trigger generation.

In some embodiments, the self-reported geolocation may be provided by any number of electronic devices that are configured to provide a geolocation. Examples include, without limitation, smart phones, smart watches, tablets, computers, laptops, or dedicated GPS tracking devices, including SPOT™-enabled tracking devices. In some embodiments, some of these devices may be installed on road-side hardware or equipment, or located on-board or near the target vehicle (for example by a smartphone of the driver of the target vehicle).

In some embodiments, the database 404 may include a plurality of databases, including 3rd-party databases or servers. In some embodiments, the database 404 may be connected to the server 402 via a network 416 (as illustrated herein), but other embodiments may have the database 404 integrated into a same hardware of server 402.

Notably, in some embodiments, the system 400 provides an agnostic interface that allows data generated by different types of databases 404, geolocation-capable devices 406 and sensors 418 to be used. For example, these may be pre-installed hardware devices that may be provided by a range of different manufacturers and which each rely on different standards and/or protocols. The server 402, as will be further discussed below, is typically configured to collect and process together any data obtained from these different data sources.

In other embodiments, the system 400 may take a series of timed, inaccurate geolocation information of a vehicle or a series of triggers in a plant production system or third-party operations management system, with approximate geolocation information, and perform similar data augmentation, learning and trigger optimizations.

In some embodiments, the tags emitters 410 may take the form of various devices not necessarily intended to be used as a tag only. This may include, without limitation, smart phones, smart watches, tablets, computers, laptops or any other computing or electronic device that is capable of using Bluetooth®, RF, UWB or other RF means to confirm a presence thereof. In some embodiments, these devices may be used to confirm a presence of a specific or anonymous vehicle within a certain boundary around a given location with or without having physical devices present to act as readers (e.g., readers 408).

Figure 5:
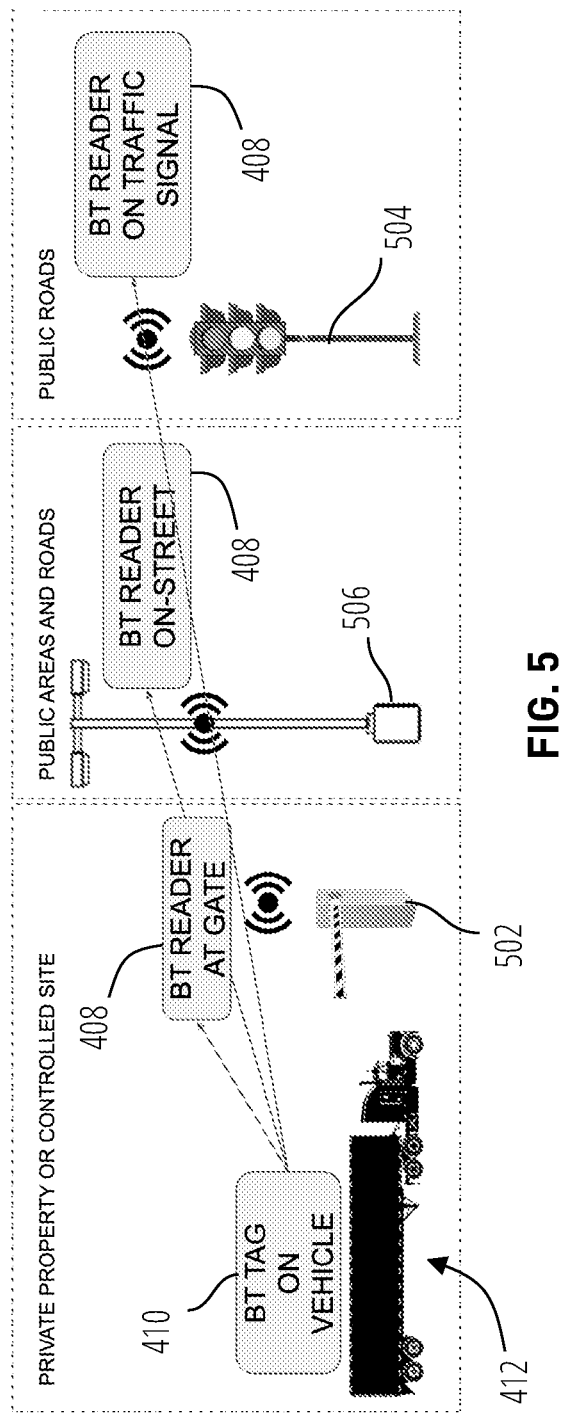
FIG. 5 illustrates schematically an aspect of the system of FIG. 4, in accordance with one embodiment.

FIG. 5 provides a schematic example of how the system 400 may use the RF tag emitters 410 and readers 408 to provide a first low-resolution geolocation of the target vehicle 412, in accordance with one embodiment. As shown in FIG. 5, the tag emitters 410, is located on a vehicle (e.g., here a truck transporting a container having the tag attached thereto) moving along a route, while the various readers 408 are distributed or located on various objects and/or infrastructure along the road. These may be located equally on private property or controlled sites, than on public areas and roads. In the example of FIG. 5, the readers 408 are found on actionable subsystems 414 (for example the gate 502 and/or the traffic signal 504 via its traffic controller) but also on other objects such as a streetlight 506. Any suitable object or location that is sufficiently near the road so as to be in range of the tag emitters 410 upon the vehicle moving near can be used.

Figure 6:
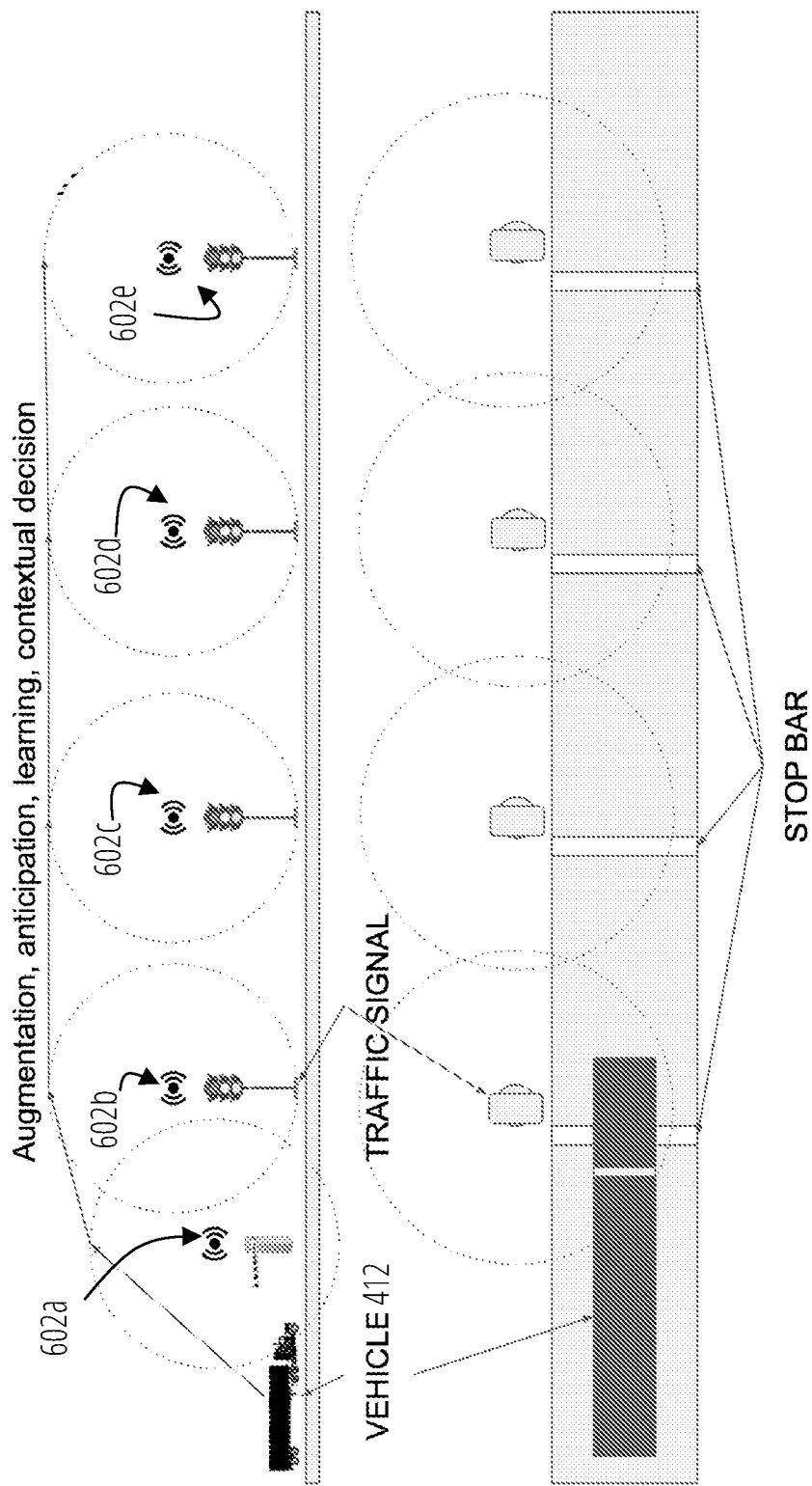
FIG. 6 illustrates another aspect of the system of FIG. 4, in accordance with one embodiment.

Thus, in such an embodiment, each RF reader will receive the RF signal in succession while the target vehicle 412 is moving along its route, thus providing a low-resolution location of said target vehicle 412 in real-time. An example is shown in the schematic diagram of FIG. 6, where the target vehicle 412 will be located by RF readers 602a, 602b, 602c, 602d and 602e, in succession, while the vehicle is moving along the path.

In some embodiments, the readers 408 are communicatively coupled to the server 402, for example via a wireless or wired network connection. The readers 408 may be battery operated and/or connected to an external power source.

In some embodiments, two or more RF readers 408 at different locations may be close enough to the vehicle so as to receive the signal from the tag emitters 410 simultaneously. In such cases, in some embodiments, the multiple simultaneous received signals may be used to triangulate the position or location of the tag emitters 410 and the associated target vehicle 412.

In some embodiments, the position or location of the tag emitters 410 may be determined, at least in part, by using a signal strength measured by the receiving readers 408.

In some embodiments, at least some of the readers 408 may be located on, near or integrated with the road infrastructure. For example, this may include street lamps, road signs, overpasses, or the like that are positioned near the road and thus in range of the tag emitters 410 when the vehicle drives in the vicinity thereof.

In some embodiments, the position or location of the target vehicle 412 estimated using the received signals at the readers 408 is converted into a geolocation (e.g., in the form of coordinates including a latitude and longitude) or the like. In some embodiments, a geo zone centered on said estimated position or location may be defined as well. This geo zone is dynamically determined as it moves along with the target vehicle, its position or location being updated in real-time or near-real-time.

Typically, the signals measured using the tag emitters 410 and readers 408 (or from other types of self-reporting devices) are noisy and the position or location of the target vehicle derived therefrom is low-resolution. Therefore, as mentioned above, the system 400 is configured to filter and augment the low-resolution geolocation into a higher-resolution geolocation.

Figure 7:
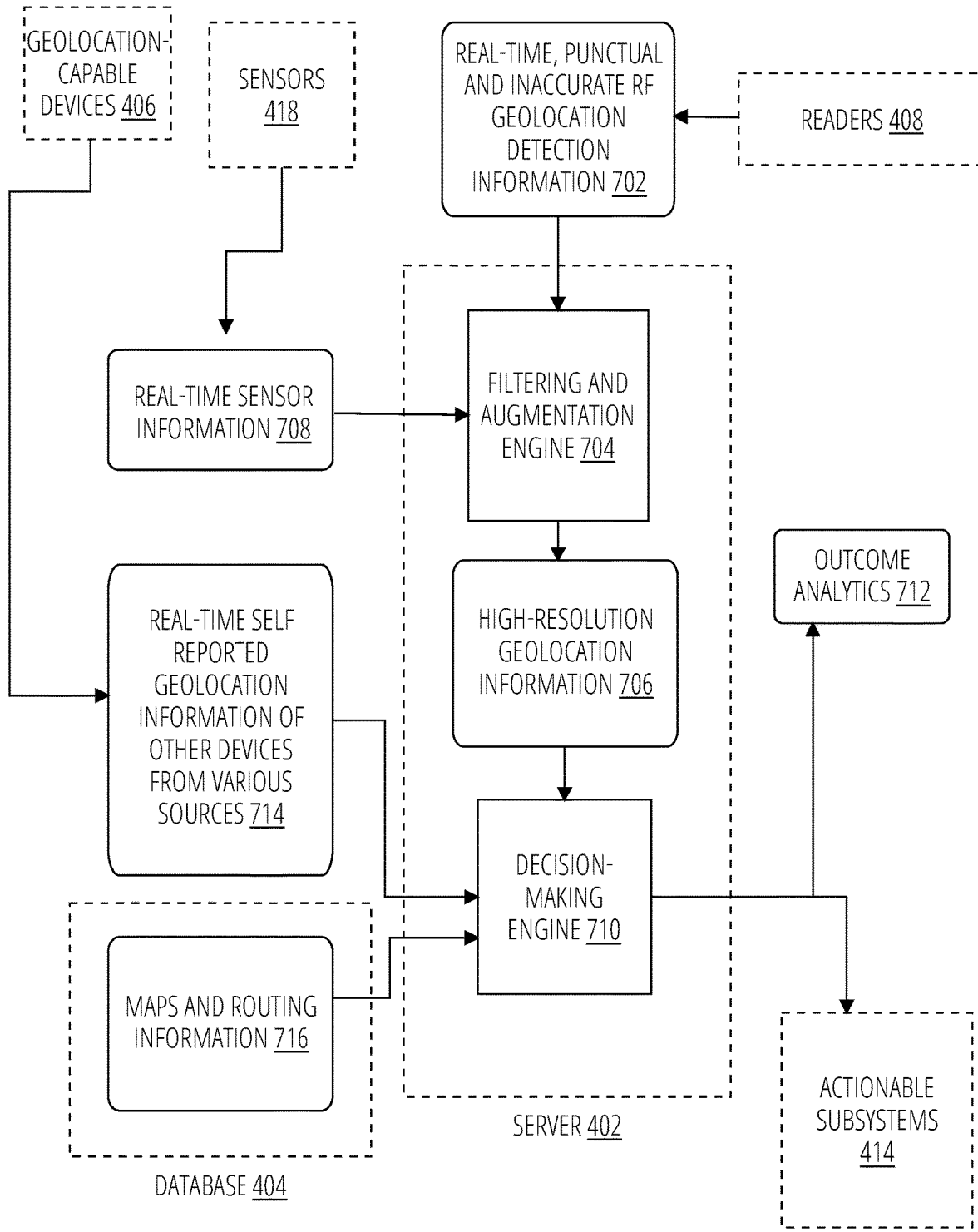
FIG. 7 is a block diagram illustrating data processing as done by the system of FIG. 4, in accordance with one embodiment.

FIG. 7 provides a block diagram illustrating, in accordance with one exemplary embodiment, how data is processed by the server 402. In the example of FIG. 7, the real-time, punctual and inaccurate RF geolocation detection information 702 provided by the readers 408 is received by the server 402 and first processed by a filtering and augmentation engine 704 implemented thereon, which is configured to filter the noisy information 702 and augment it into a high-resolution geolocation information 706 by comparing it to additional real-time sensor information 708 provided by one or more of the sensors 418 or by triggering events based solely on inaccurate inputs based on previously learned patterns and outcomes. In some embodiments, the high-resolution geolocation information 706 may take the form of a probabilistic geolocation that uses or combines, at least in part, the low-resolution information 702.

Upon the high-resolution geolocation information 706 being available, it is sent to a decision-making engine 710 of server 402 that uses that information, in addition to a plurality of additional data sources, to provide outcome analytics 712 and ultimately send requests to the actionable subsystems 414. The decision-making engine 710 may comprise one or more machine-learning models trained on travel statistics derived from previously acquired travel data of previously tracked vehicles.

In addition, as written above, the decision-making engine 710 if further configured or trained to use a plurality of additional data sources, such as real-time self-reported geolocation information 714 sent by a plurality of geolocation-capable devices 406, maps and routing information 716, obtained via routing APIs or via privately or publicly available maps or the like, including real-time traffic monitoring information, and real-time data received from the actionable subsystems 414.

In some embodiments, the outcome analytics 712 may include a range of probabilities or likelihood related to the target vehicle 412 being forced to stop at an incoming actionable subsystem 414. In some embodiments, this may take the form of computing a probability of an estimated arrival time (ETA) of when the target vehicle will reach an upcoming subsystem (e.g., traffic signal), including, for example, further probabilities of the target vehicle being forced to stop at the upcoming subsystem (for example based on data received from the subsystem), and of the stop being avoidable upon a request to the subsystem being made at that moment. In some embodiments, these probabilities may be compared to different thresholds. Upon the thresholds being met, this may result in the decision-making engine 710 to send a request to the upcoming subsystem.

In some embodiments, the decision-making engine 710 may use the maps and routing information 716, such as trajectory data, to analyze and learn by using approaches such as M-Atlas and the like, to determine models, anticipate traffic patterns or predict areas of future congestion.

In some embodiments, any other data sources or information not mentioned above may also be used. For example, this may include data or information relating to weather or climate.

Figure 8:
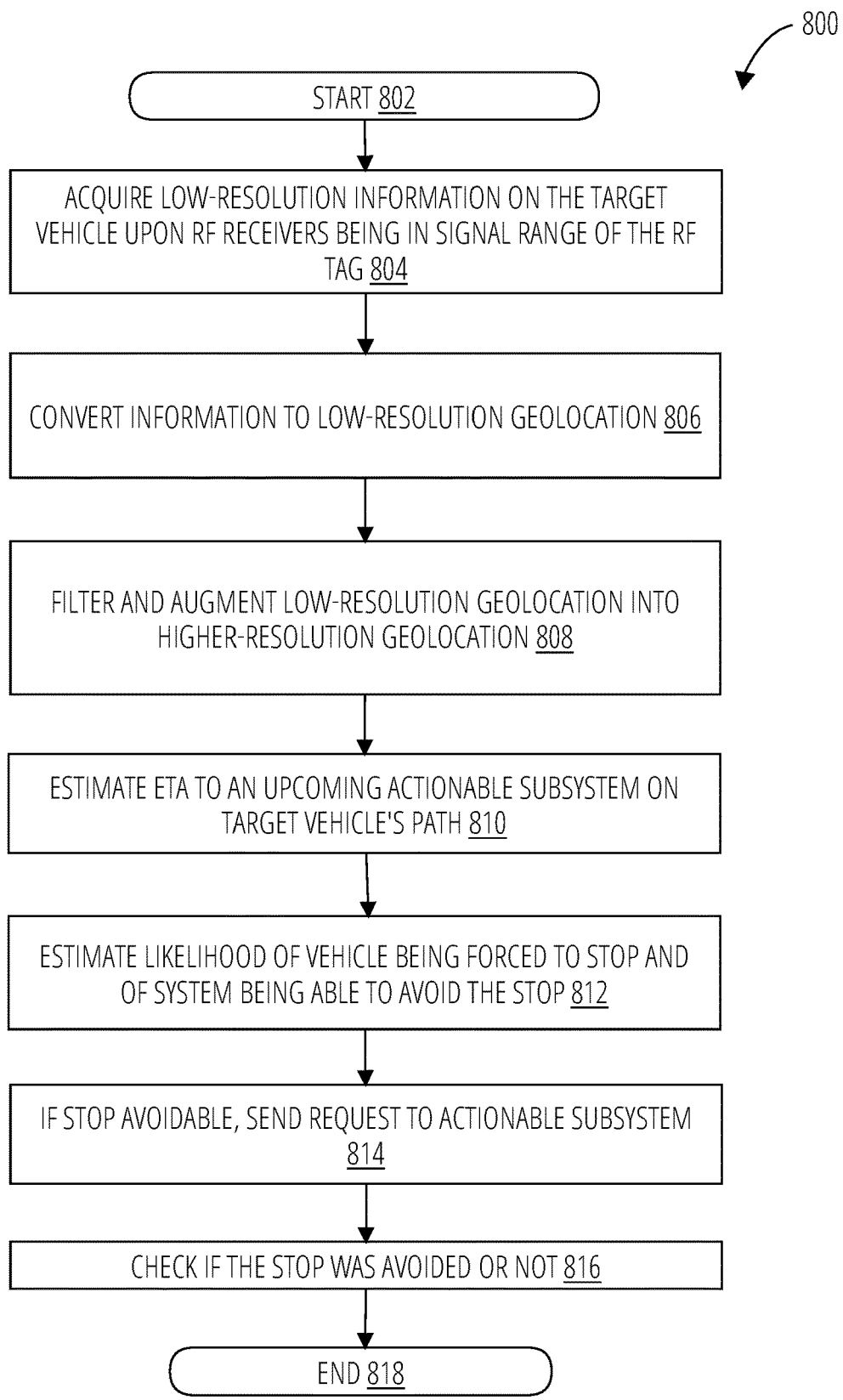
FIG. 8 is a process flow diagram illustrating a data-augmented tag-based vehicle stop avoidance method as implemented by the system of FIG. 4, in accordance with one embodiment.

FIG. 8 is a process flow diagram illustrating a data-augmented tag-based vehicle stop avoidance method for minimizing the number of stops made by a target vehicle moving along a path or route, referred herein using the numeral 800, in accordance with one exemplary embodiment.

The method starts at step 802. At step 804, each RF reader 408 located along the route will detect the tag emitter 410 upon it coming in signal range when the target vehicle moves in the vicinity of the reader. Each reader will send a low-resolution kinematic information (e.g., position, speed and direction) to the server 402 so that, at step 806, a low-resolution geolocation information 702 of the target vehicle 412 may be obtained in real-time. As mentioned above, in some embodiments, data from two or more RF readers may be used simultaneously, and techniques such as triangulation may be used as well. In other embodiments, data from a 3rd-party tags and readers may be used as well. In some embodiments, data from one kind of signal reader and emitter may be used (such as a RF tag emitter and reader, but also from other self-reporting devices), or two or more different kinds of signal readers/emitters may be preferable for further enhancing a determination of the geolocation.

At step 808, the low-resolution geolocation information 702 may preferably be processed by a filtering and augmentation engine 704, which filters noisy data and augments it using real-time sensor information 708 obtained from the plurality of sensors 418 into a high-resolution geolocation information 706.

At step 810, the high-resolution geolocation information 706 is used by the decision-making engine 710, in conjunction with self-reported geolocation information 714, maps and routing information 716 and information or data provided by the actionable subsystems 414, to provide outcome analytics 712, such as an estimated ETA of the target vehicle 412 to an upcoming actionable subsystem 414. In some embodiments, the ETA may be computed using physics-based or kinematics-based models (e.g., using variables such as position, speed, and time), or it may in other embodiments be computed using probabilistic models. An example of the latter is if a target vehicle is arriving at a location at a given time, the decision-making engine 710 may take into account the plurality of data sources determines a high probability of the ETA at an upcoming traffic signal being between A and B seconds.

At step 812, a likelihood of the target vehicle being forced to stop at the ETA is computed, and upon deciding that this is indeed the case, at step 814 a second likelihood is computed to see if the stop is avoidable upon a request being sent to the actionable subsystem. If this is case, then at step 814, a request is made by the server 402 to the upcoming actionable subsystem 414 to trigger (or not trigger) an event.

In some embodiments, the server 402 may also elect to use a form of next level decision making where the outcomes from multiple vehicles are combined and may determine if one situation should be chosen over another to improve the general performance of the system or providing individual service-based on server-level agreements, contracts, environmental impact, financial outcome or others.

At step 816, the low-resolution or high-resolution geolocation data is analyzed to check if the target vehicle did indeed avoid the stop or was forced to stop. A count of avoided avoidable stops is made which may be used, for example, to charge the user of the system 400 per avoided stops.

The method ends at step 818. The skilled person in the art will appreciate that different embodiments may use different steps than those listed above. For example, in some embodiments, the explicit calculation of an ETA may be avoided, and the requests may be based on indirect, for example statistical or probabilistic computations. For example, this may include determining a probabilistic geolocation of the target vehicle 412 at a given time, and using this information in a model that determines a given outcome, based on statistical information and the plurality of data sources noted above, without having explicitly calculated a trajectory or ETA of the target vehicle.

Figure 9:
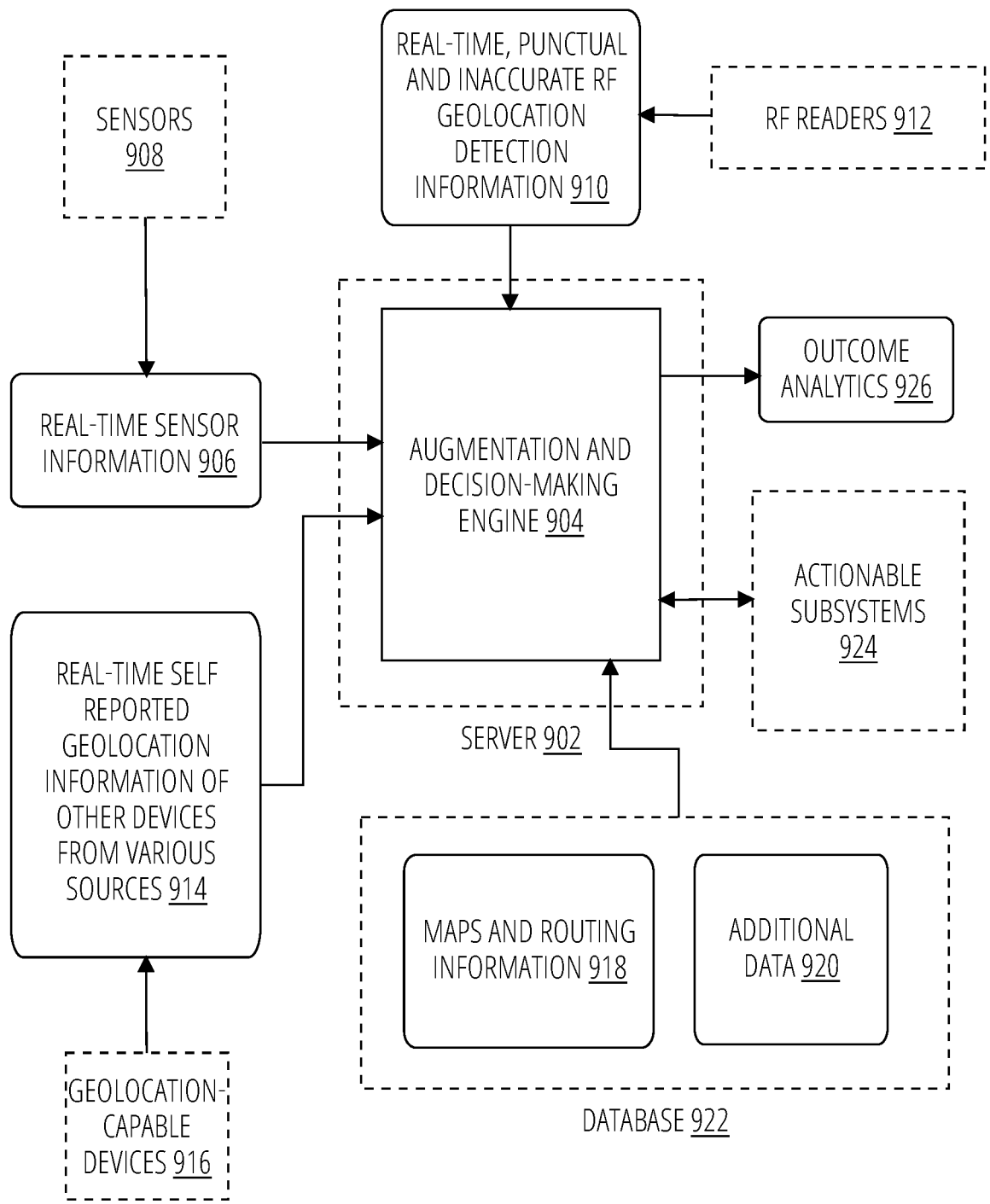
FIG. 9 is a block diagram illustrating data processing as done by the system of FIG. 4, in accordance with another embodiment.

FIG. 9 is a block diagram illustrating data processing as done by the system 400 in accordance with another embodiment. In contrast to the diagram of FIG. 7, in this embodiment, the filter and augmentation engine and the decision-making engine of a server 902 have been combined into or replaced with a single augmentation and decision-making engine 904. Furthermore, this example does not rely on generating a high-resolution geolocation nor calculating an ETA. Instead, it relies on using either a probabilistic geolocation or, in some examples, does not use a location for the target vehicle at all. Rather, the augmentation and decision-making engine 904 is configured to learn from the various sources of data (e.g., real-time sensor information 906 from sensors 908, real-time, punctual and inaccurate RF geolocation detection information 910 from the RF readers 912, real-time self-reported geolocation information of other devices 914 from the geolocation-capable devices 916, maps and routing information 918 or additional data 920 from database 922, and real-time information from the actionable subsystems 924 to generate stop avoidance (e.g., outcome analytics 926 and triggers to the actionable subsystems 924) when the actuation takes place based on unanticipated variables.

The additional data 920 may include any data or information that may related or influence, directly or indirectly, the trajectory of the target vehicle or any other vehicles.

In some embodiments, the unanticipated variables may include unanticipated combinations of movements. In one example, this could include a system having multiple users or targeted vehicles showing correlated or repeating sequences. For example, there could be a situation where a train is present and if other vehicles (not the targeted vehicle, but other vehicles also using the tag system) are present and detected at other tag readers, triggering a signal would free up a section, which would in turn indirectly prevent the stop, considering the geolocation of the target vehicle to optimize.

Figure 10:
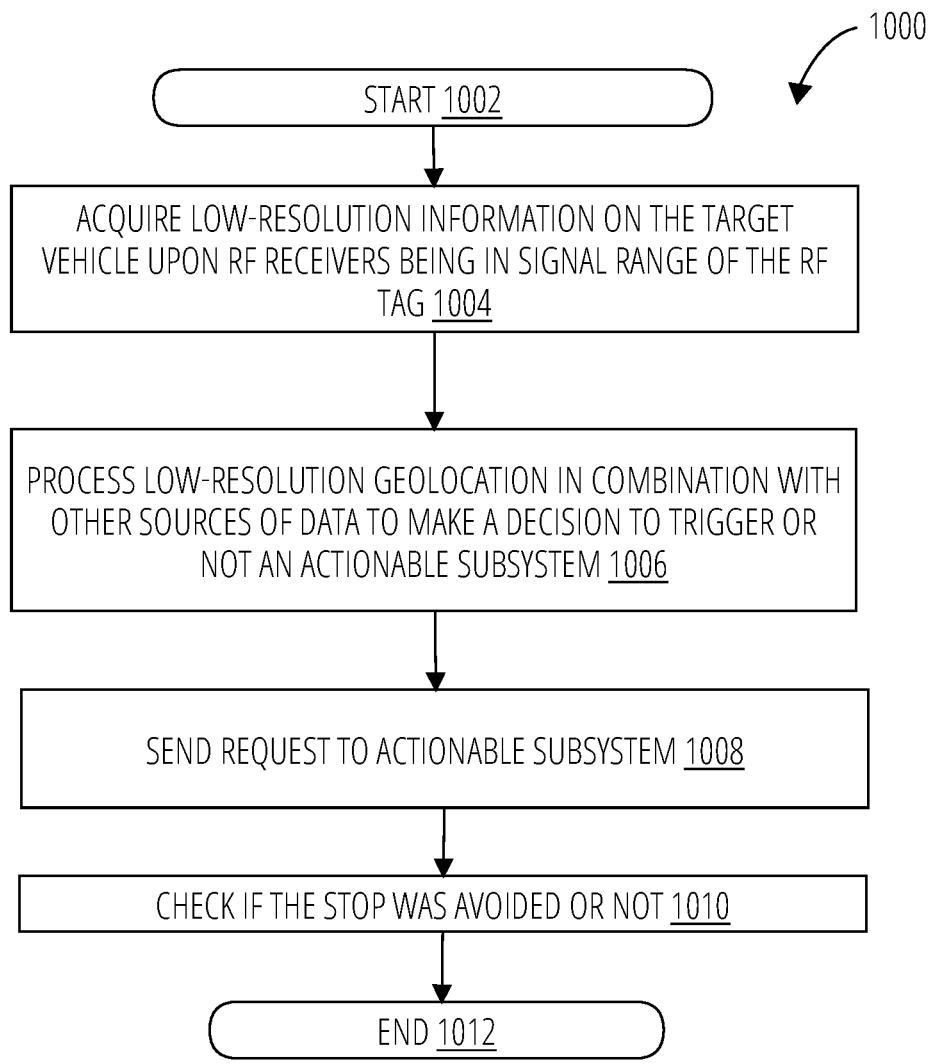
FIG. 10 is another process flow diagram illustrating another data-augmented tag-based vehicle stop avoidance method as implemented by the system of FIG. 4, in accordance with one embodiment.

FIG. 10 is an exemplary process flow diagram of a method 1000 for minimizing the number of stops of a target vehicle not relying on computing an ETA or the like.

The method starts at step 1002. At step 1004, the system acquires or receives from a 3rd-party a plurality of low-resolution positional information, for example via the emitters 410 and readers 408. This includes not only information about the target vehicle 412, but also similar information from other vehicles using the same readers 408.

At step 1006, the system 400 processes the low-resolution positional information in combination with the other sources of data noted above using one or more machine-learning models so as to produce, at step 1008, a decision to send a request to an actionable subsystem or not.

In some embodiments, this may include deriving a probabilistic geolocation of the target vehicle, but other embodiments may not rely on a geolocation of the target vehicle at all, but instead use holistically the different sources of data to infer or determine when requests or triggers may be sent to actionable subsystems so as to minimize the number of avoidable stops made by the target vehicle.

At step 1010, optionally, a verification can be made using the various data sources to track the number of avoidable stops that were prevented by the system.

Step 1010 may comprise verifying, using the various data sources, whether or not the avoidable stop was avoided, and upon the stop being avoided, recording the stop as an avoided stop.

The method ends at step 1012.

In some embodiments, different machine-learning algorithms or techniques may be used, alone or in combination, in the different engines noted above (e.g., the filtering and augmentation engine 704, the decision-making engine 710, the augmentation and decision-making engine 904, etc.). These may include, for example, deep learning architectures such as Deep Belief Network (DBN), Stacked Auto Encoder (SAE), Convolutional Neural Network (CNN) or Recurrent Neural Network (RNN) may be used. Other examples include, without limitation, Restricted Boltzmann machines (RBM), Social Restricted Boltzmann Machines (SRBM), Fuzzy Restricted Boltzmann Machines (FRBM), TTRBM models of Deep Belief Networks (DBN) or similar approaches could be used; AE, FAE, GAE, DAE, BAE models of Statistically Adjusted End Use (SAE) models could be used; models such as AlexNet, ResNet®, Inception, VGG16, ECNN models of CNN may be used; Bidirectional Recurrent Neural Networks (BiRNN), Long Short-Term Memory (LSTM) networks, Gate Recurrent Unit (GRU) of RNN may also be used.

In some embodiments, other types of algorithms such as physics-based mathematical computations and basic multiple linear regression models may also be relied upon in conjunction with or in complementarity with those architectures and learning algorithms.

In some embodiments, the system 400 discussed above may be further use, in addition to or in replacement of the tag emitters 410 and readers 408, on the electronic devices configured to self-report a geolocation (e.g., the self-reported geolocation information 714) directly to the server 402 via the network. Thus, in some embodiments, the RF emitters may be considered one example of a plurality of different signal emitters that may be used. More generally, the RF readers may be considered as being one example of geolocation reporting devices communicating with the server. Other such devices also include self-reporting devices such as GPS-enabled devices or the like that are positionally coupled with the vehicle.

For example, in embodiments, the system may further be configured to evaluate or estimate the quality of the geolocation data received, and based on such an evaluation, further enhance the data by obtaining additional data from additional sources, or refrain from requesting a stop be triggered due to an inability to obtain such additional data. In some embodiments, evaluation of the reported geolocation data may be based on a time between signals received (e.g. a latency value).

A data-augmented vehicle stop avoidance method may, therefore, further comprise calculating, using a difference between a time that a first signal is received and a time that a second signal is received, a latency value.

In some embodiments, using at least in part the latency value, the decision-making engine 710, the filtering and augmentation engine 704, or the like, may thus further process the geolocation data, for example by first determining a latency threshold and then, upon said latency value being above said latency threshold: a) not marking said upcoming subsystem as an avoidable stop, or b) lowering said latency threshold by receiving additional signals from said plurality of signal emitters.

In some embodiments, the latency threshold may be a fixed value. Alternatively, it may be determined based on additional information, including real-time sensor information 708, maps and routing information 716, vehicle information, statistical data, and any other information available to the decision-making engine 710.

In practice, real-time self-reported geolocation information of other devices from various sources 714 may have a high latency value, in which case it may be preferable for the decision-making engine 710 to gather additional data, for example from an RF tag emitter positionally associated with the vehicle. Then, an upcoming stop may be analyzed to determine whether or not it is avoidable, thus triggering, or not triggering, an event for an upcoming actionable subsystem 414.

Alternatively, the decision-making engine 710 may determine, based on the available data, that there is not enough information to determine whether or not an upcoming stop is avoidable, and thus does not trigger an event for an upcoming actionable subsystem 414.

In some embodiments, a latency value of received signal data may then be determined through timestamps, traces on protocols or any other mean of validating the latency of the signal data received.

Many of the functional units described in this specification have been labeled as "engines", in order to more particularly emphasize their implementation independence. For example, an engine may be implemented as a hardware circuit comprising custom VLSI circuits or gate arrays, off-the-shelf semiconductors such as logic chips, transistors, or other discrete components. An engine may also be implemented in programmable hardware devices such as field programmable gate arrays, programmable array logic, programmable logic devices or the like.

Engines may also be implemented in software for execution by various types of processors. An identified engine of executable code may, for instance, comprise one or more physical or logical blocks of computer instructions which may, for instance, be organized as an object, procedure, or function. Nevertheless, the executables of an identified engine need not be physically located together, but may comprise disparate instructions stored in different locations which, when joined logically together, comprise the engine and achieve the stated purpose for the module.

Indeed, an engine of executable code may be a single instruction, or many instructions, and may even be distributed over several different code segments, among different programs, and across several memory devices. Similarly, operational data may be identified and illustrated herein within engines, and may be embodied in any suitable form and organized within any suitable type of data structure. The operational data may be collected as a single data set, or may be distributed over different locations including over different storage devices, and may exist, at least partially, merely as electronic signals on a system or network. Where an engine or portions of an engine are implemented in software, the software portions are stored on one or more computer readable storage media.

The present disclosure includes systems having processors to provide various functionality to process information, and to determine results based on inputs. Generally, the processing may be achieved with a combination of hardware and software elements. The hardware aspects may include combinations of operatively coupled hardware components including microprocessors, logical circuitry, communication/networking ports, digital filters, memory, or logical circuitry. The processors may be adapted to perform operations specified by a computer-executable code, which may be stored on a computer readable medium.

The steps of the methods described herein may be achieved via an appropriate programmable processing device or an on-board field programmable gate array (FPGA) or digital signal processor (DSP), that executes software, or stored instructions. In general, physical processors and/or machines employed by embodiments of the present disclosure for any processing or evaluation may include one or more networked or non-networked general purpose computer systems, microprocessors, field programmable gate arrays (FPGA's), digital signal processors (DSP's), micro-controllers, and the like, programmed according to the teachings of the exemplary embodiments discussed above and appreciated by those skilled in the computer and software arts. Appropriate software can be readily prepared by programmers of ordinary skill based on the teachings of the exemplary embodiments, as is appreciated by those skilled in the software arts. In addition, the devices and subsystems of the exemplary embodiments can be implemented by the preparation of application-specific integrated circuits, as is appreciated by those skilled in the electrical arts. Thus, the exemplary embodiments are not limited to any specific combination of hardware circuitry and/or software.

Stored on any one or a combination of computer readable media, the exemplary embodiments of the present invention may include software for controlling the devices and subsystems of the exemplary embodiments, for driving the devices and subsystems of the exemplary embodiments, for processing data and signals, for enabling the devices and subsystems of the exemplary embodiments to interact with a human user or the like. Such software can include, but is not limited to, device drivers, firmware, operating systems, development tools, applications software, and the like. Such computer-readable media further can include the computer program product of an embodiment of the present invention for preforming all or a portion (if processing is distributed) of the processing performed in implementations. Computer code devices of the exemplary embodiments of the present invention can include any suitable interpretable or executable code mechanism, including but not limited to scripts, interpretable programs, dynamic link libraries (DLLs), complete executable programs and the like.

Common forms of computer-readable media may include, for example, magnetic disks, flash memory, RAM, a PROM, an EPROM, a FLASH-EPROM, or any other suitable memory chip or medium from which a computer or processor can read.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the present disclosure.

What is claimed is:

1. A computer-implemented method for minimizing a number of stops made by a vehicle traveling along a path, said path comprising one or more actionable subsystems, the method comprising the steps of:
   receiving, at at least one server, from one or more geolocation reporting devices via a network, geolocation data of said vehicle;
   estimating, by the at least one server, using at least in part said geolocation data, a likelihood that an upcoming subsystem of said one or more actionable subsystems is an avoidable stop for said vehicle upon an action request being made to said upcoming subsystem; and
   upon estimating said upcoming subsystem being an avoidable stop, requesting by the at least one server the action request to said upcoming subsystem via said network; and
   triggering the upcoming subsystem in accordance with the action request.

2. The computer-implemented method of claim 1, wherein said one or more geolocation reporting devices comprise one or more radio frequency (RF) readers located along said path, the one or more RF readers configured to receive one or more signals emitted by a RF tag emitter positionally coupled to said vehicle upon said tag emitter being in signal range of said one or more tag readers.

3. The computer-implemented method of claim 1, wherein said estimating is done, at least in part, using one or more machine learning models trained on at least one of:
   statistical travel information generated using a plurality of previously recorded travel information of a corresponding plurality of previously monitored vehicles; or
   real-time sensor information acquired by a plurality of sensors and related to said vehicle and to a plurality of secondary target assets, said secondary target assets also moving along or across said path.

4. The computer-implemented method of claim 3, wherein the one or more machine learning models are trained on said real-time sensor information, and wherein the plurality of secondary target assets comprise at least one of: pedestrians or other vehicles.

5. The computer-implemented method of claim 1, wherein said estimating comprises the steps of:
   augmenting said geolocation data into higher-resolution geolocation data;
   calculating, based on at least in part said higher-resolution geolocation data, an estimated time of arrival (ETA) of said vehicle to a target location of said upcoming subsystem of said one or more actionable subsystems; and computing a first probability of said vehicle being forced to stop at said upcoming subsystem at said ETA;

upon said first probability being higher than a first threshold, computing a second probability of said stop being avoidable upon said action request being made to said upcoming subsystem; and upon said second probability being higher than a second threshold, designating said upcoming subsystem as said avoidable stop.

6. The computer-implemented method of claim 5, wherein said higher-resolution geolocation is a probabilistic geolocation.

7. The computer-implemented method of claim 1, further comprising the steps of:

verifying, by the at least one server, using at least in part said geolocation data, whether or not the avoidable stop was avoided as a result of said triggering; and upon said stop being avoided, recording the stop as an avoided stop along said path.

8. The computer-implemented method of claim 1, wherein the upcoming subsystem comprises a gate or barrier.

9. The computer-implemented method of claim 1, wherein the one or more actionable subsystems comprise a mobile actionable subsystem.

10. The computer-implemented method of claim 1, wherein said estimating comprises the step of:

determining, using one or more machine learning models trained on a plurality of data sources to infer directly, based on at least in part said geolocation and without calculating an estimated time of arrival (ETA), the likelihood of the upcoming subsystem being an avoidable stop.

11. A system for minimizing a number of stops made by a vehicle travelling along a path, the system comprising:

one or more actionable subsystems located along said path;

one or more geolocation reporting devices;

at least one server comprising one or more processors and a memory, the one or more processors being communicatively coupled to said plurality of geolocation reporting devices via a network, and wherein said memory comprises instructions that, when executed by said one or more processors, configures the server to:

receive, from one or more geolocation providing devices, geolocation data of said vehicle;

estimate, using at least in part said geolocation data, a likelihood that an upcoming subsystem of said one or more actionable subsystems is an avoidable stop for said vehicle upon an action request being made to said upcoming subsystem; and upon estimating said upcoming subsystem being an avoidable stop, request the action request to said upcoming subsystem via said network; and wherein the upcoming subsystem is configured to be triggered in accordance with the action request.

12. The system of claim 11, wherein said one or more geolocation reporting devices comprise one or more radio-frequency (RF) readers located along said path, the one or more RF readers configured to receive one or more signals emitted by a RF tag emitter positionally coupled to said vehicle upon said tag emitter being in signal range of said one or more tag readers.

13. The system of claim 11, wherein said estimating is done, at least in part, using one or more machine learning models trained on at least one of:

statistical travel information generated using a plurality of previously recorded travel information of a corresponding plurality of previously monitored vehicles; or real-time sensor information acquired by a plurality of sensors and related to said vehicle and to a plurality of secondary target assets, said secondary target assets also moving along or across said path.

14. The system of claim 13, wherein the one or more machine learning models are trained on said real-time sensor information, and wherein the plurality of secondary target assets comprise at least one of: pedestrians or other vehicles.

15. The system of claim 11, wherein said instructions further configure the at least one server to:

augment said geolocation data into higher-resolution geolocation data;

calculate, based at least in part on said higher-resolution geolocation data, estimated time of arrival (ETA) of said vehicle to a target location of said upcoming subsystem of said one or more actionable subsystems; and compute a first probability of said target vehicle will be forced to stop at said upcoming subsystem at said ETA; and upon said first probability being higher than a first threshold, compute a second probability of said stop being avoidable upon said action request being made to said upcoming subsystem; and upon said second probability being higher than a second threshold, designating said upcoming subsystem as said avoidable stop.

16. The system of claim 15, wherein said higher-resolution geolocation is a probabilistic geolocation.

17. The system of claim 11, wherein said instructions further configure the at least one server to:

verify, using at least in part said geolocation data, whether or not the avoidable stop was avoided as a result of said triggering; and upon said avoidable stop being avoided, record the avoidable stop as an avoided stop along said path.

18. The system of claim 11, wherein the upcoming subsystem comprises a gate or barrier.

19. The system of claim 11, wherein the one or more actionable subsystems comprise a mobile actionable subsystem.

20. The system of claim 11, wherein said estimating comprises the step of:

determining, using one or more machine learning models trained on a plurality of data sources to infer directly, without calculating an estimated time of arrival (ETA), based on at least in part said geolocation, the likelihood of the upcoming subsystem being an avoidable stop.

* * * * *